(12) United States Patent
Masuda

(10) Patent No.: US 9,272,623 B2
(45) Date of Patent: Mar. 1, 2016

(54) DISPLAY DEVICE

(75) Inventor: Hideki Masuda, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 157 days.

(21) Appl. No.: 14/240,286

(22) PCT Filed: Jul. 5, 2012

(86) PCT No.: PCT/JP2012/067158
§ 371 (c)(1),
(2), (4) Date: Feb. 21, 2014

(87) PCT Pub. No.: WO2013/027496
PCT Pub. Date: Feb. 28, 2013

(65) Prior Publication Data
US 2014/0216329 A1 Aug. 7, 2014

(30) Foreign Application Priority Data
Aug. 23, 2011 (JP) .................. 2011-182047

(51) Int. Cl.
*G01D 7/04* (2006.01)
*G01D 13/04* (2006.01)
(Continued)

(52) U.S. Cl.
CPC ............... *B60K 35/00* (2013.01); *B60K 37/02* (2013.01); *G01D 7/04* (2013.01); *G01D 13/04* (2013.01); *B60K 2350/1064* (2013.01); *B60K 2350/1096* (2013.01); *B60K 2350/403* (2013.01); *B60K 2350/405* (2013.01); *B60K 2350/408* (2013.01)

(58) Field of Classification Search
CPC .. B60K 35/00; B60K 37/02; B60K 2350/405; G01D 7/00; G01D 7/02; G01D 7/04; G01D 13/04

USPC ..................... 116/28 R, 62.1, 62.4, 300, 305; 340/461, 462
See application file for complete search history.

(56) References Cited

U.S. PATENT DOCUMENTS 9,010,268 B2* 4/2015 Kato ...................... G01D 13/02
116/305
2006/0092001 A1 5/2006 Yokota et al.
2008/0024288 A1* 1/2008 Kageyama ............. B60K 35/00
340/461

FOREIGN PATENT DOCUMENTS

DE 4240465 A1 6/1994
DE 102004024596 A1 3/2005
(Continued)

OTHER PUBLICATIONS

International Search Report issued in Application No. PCT/JP2012/067158 dated Aug. 7, 2012.

*Primary Examiner* — R. A. Smith
(74) *Attorney, Agent, or Firm* — McDermott Will & Emery LLP

(57) ABSTRACT

Provided is a display device with which it is possible to implement a novel display. A display device comprises: a display unit which displays a display image in a display region; a framing unit is configured from a plurality of components; and a moving device which moves at least one of the plurality of components. The framing unit is segmented by moving at least one of the components by the moving mechanism. Prior to segmenting, the framing unit surrounds a partial region of the display region of the display unit. The display unit displays a different display image before and after the segmenting of the framing unit, and displays a notification image which fits the shape of the framing unit at least either before or after the segmentation of the framing unit.

6 Claims, 11 Drawing Sheets

(51) Int. Cl.
  *B60K 35/00*   (2006.01)
  *B60K 37/02*   (2006.01)

(56) References Cited

FOREIGN PATENT DOCUMENTS

| EP | 2703206 | A1 | * | 3/2014 | ............. | B60K 35/00 |
| JP | 2-124589 | U | | 10/1990 | | |
| JP | 2005331317 | A | | 12/2005 | | |
| JP | 2006132950 | A | | 5/2006 | | |
| JP | 2010175411 | A | | 8/2010 | | |
| JP | 2010276496 | A | | 12/2010 | | |
| JP | 5219893 | B2 | * | 6/2013 | ............. | B60K 35/00 |
| JP | 2013238817 | A | * | 11/2013 | ............. | B60K 35/00 |
| JP | 2015121484 | A | * | 7/2015 | ............... | G01D 7/02 |

* cited by examiner (a)

(b)

(c)

TRAVELING SCREEN DISPLAY (a)

DISPLAY OF BACK MONITOR (b)

(a) THIRD PATTERN (b) RADIO DISPLAY

DISPLAY DEVICE

CROSS-REFERENCE TO RELATED APPLICATIONS

The present application is the U.S. National Phase of PCT/JP2012/067158 dated Jul. 5, 2012 which claims priority from Japanese Patent Application No. 2011-182047 filed Aug. 23, 2011 the subject matter of each is incorporated herein by reference in entirety.

TECHNICAL FIELD

The present invention relates to a display device.

BACKGROUND ART

There is, for example, a vehicle gauge as a display device. PTL 1 discloses a vehicle gauge that includes a bezel, two annular sections which are positioned in the display region of the bezel, and a moving mechanism which causes the two annular sections to move using the power of an electric motor. The two annular sections include, for example, an annular section which functions as an outer frame of a tachometer for displaying the number of revolutions of an engine, and an annular section which functions as an outer frame of a speed meter for displaying a vehicle speed. Each of the annular sections can move in the substantially horizontal direction using the moving mechanism when viewed from an observer. The vehicle gauge causes the two annular sections to move and causes the display content of the bezel to change in accordance with the movement of the annular sections.

CITATION LIST

Patent Literature

PTL 1: JP-A-2010-175411

SUMMARY OF INVENTION

Technical Problem

Since the vehicle gauge disclosed in PTL 1 causes the annular sections merely to move on the bezel without changing the form thereof, there is room for improvement in performing a new display and to please a user.

The invention is made to solve the above problem, and an object of the invention is to provide a display device which can realize a new display.

Solution to Problem

The invention provides a display device which is loaded on a vehicle, including: a display part that displays a display image which includes a notification image to notify a state of the vehicle in a display region; a frame body that is positioned on the display region of the display part, and is configured to include a plurality of components; and a movement unit that causes at least one component of the plurality of components to move. The frame body is segmented in such a way that at least the one component is moved by the movement unit, and is configured to surround one region of the display region of the display part before segmentation is performed, and the display part displays the display image which differs depending on before and after the segmentation is performed on the frame body, and displays the notification image in accordance with a form of the frame body at least one of before and after the segmentation is performed on the frame body.

According to the invention, before the segmentation is performed on the frame body, the display part displays the notification image in accordance with the form of the frame body in the one region which is surrounded by the frame body.

According to the invention, after the segmentation is performed on the frame body, the display part displays a prescribed image in a region, which is formed between the frame bodies acquired through the segmentation, of the display region of the display part.

According to the invention, after the segmentation is performed on the frame body, the display part displays the notification image in accordance with the form of at least one of the plurality of components.

According to the invention, the frame body is configured to include a first component and a second component, and the segmentation is performed on the frame body in such a way that both the first component and the second component or either of them is moved by the movement unit, and the segmentation is performed on the frame body in the horizontal direction based on a fact that movement direction of the first component and the second component is the horizontal direction when viewed from an observer of the display device.

According to the invention, before the segmentation is performed on the frame body, the plurality of components of the frame body approach each other without coming into contact with each other, and thus a gap part is formed between adjacent components of the plurality of components, and a rib part is formed on at least one component of the plurality of components, which conceals the gap part.

Advantageous Effects of Invention

According to the invention, it is possible to perform a new display.

DESCRIPTION OF EMBODIMENTS

A display device according to an embodiment of the invention will be described with reference to the accompanying drawings.

Figure 1:
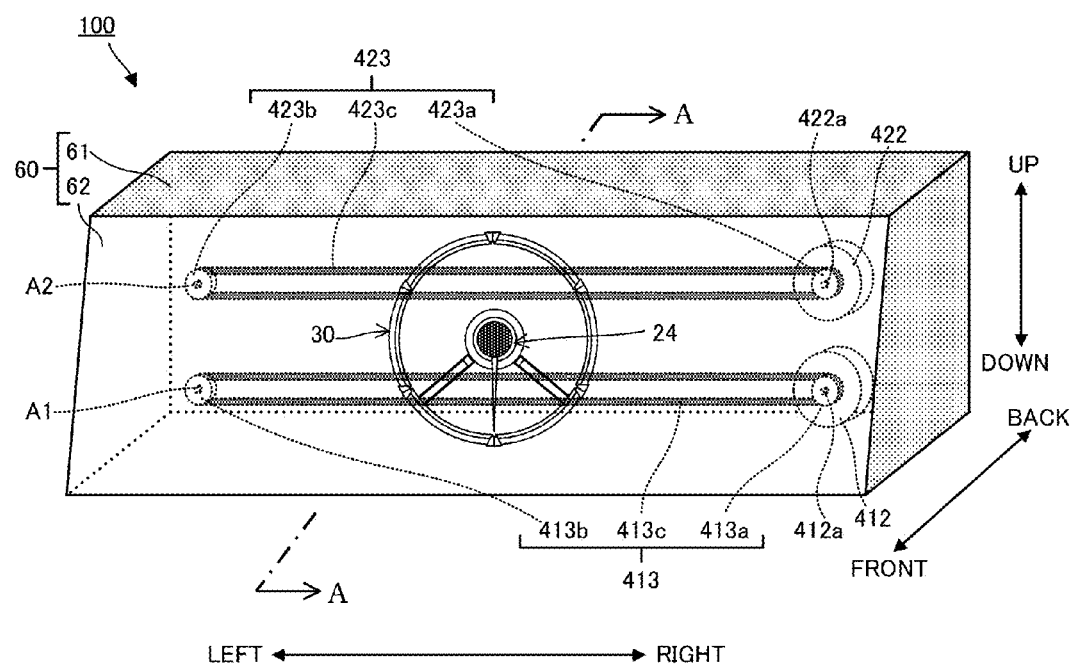
FIG. 1 is a schematic diagram illustrating an appearance of a display device according to an embodiment of the invention, and is a typical diagram illustrating the positions of the respective parts of the display device, that is, a first driving part, a second driving part, a first transmission mechanism, and a second transmission mechanism.

A display device 100 according to the embodiment is a vehicle gauge which is built a vehicle, and the external shape of the display device 100 is shown in FIG. 1.

Figure 2:
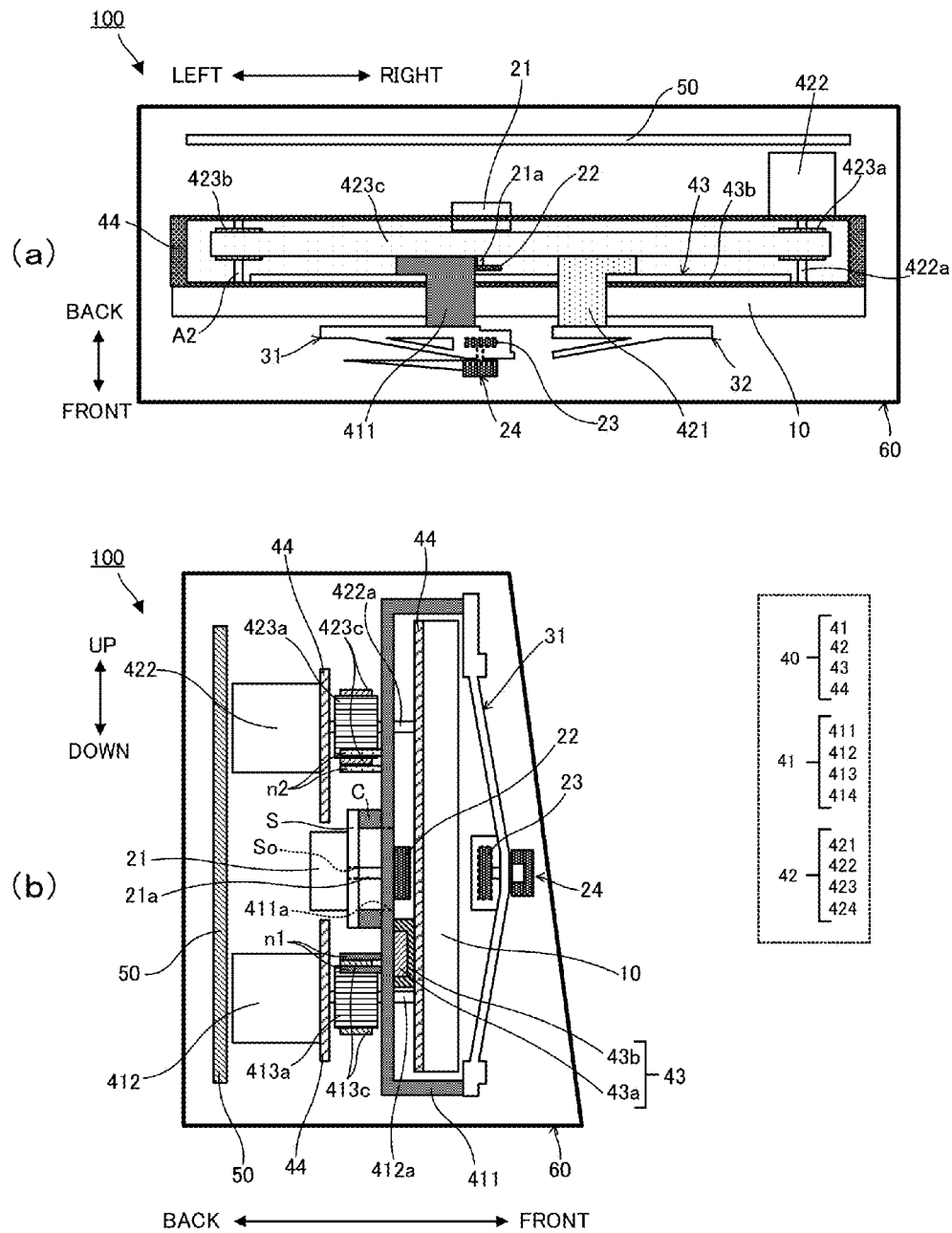
FIG. 2(a) is a schematic transmission view illustrating a case in which the display device of FIG. 1 is viewed from the upper side.
FIG. 2(b) is a schematic sectional diagram taken along a line A-A of the display device of FIG. 1.

As shown in FIGS. 2(a) and 2(b), the display device 100 includes a display unit 10, a pointer type gauge 20, a framing unit 30, a moving mechanism 40, a circuit substrate 50, and a case body 60.

Meanwhile, hereinafter, as shown using double arrows in FIG. 1, description is made in such a way that the display surface direction of the display device 100 (that is, a user side direction with respect to the display device 100) is set to "front", a direction opposite to the display surface direction is set to "back", and up, down, left, and right directions acquired when the display surface is viewed by a user who visually recognizes the display surface are set to "up", "down", "left", and "right", respectively.

Figure 8:
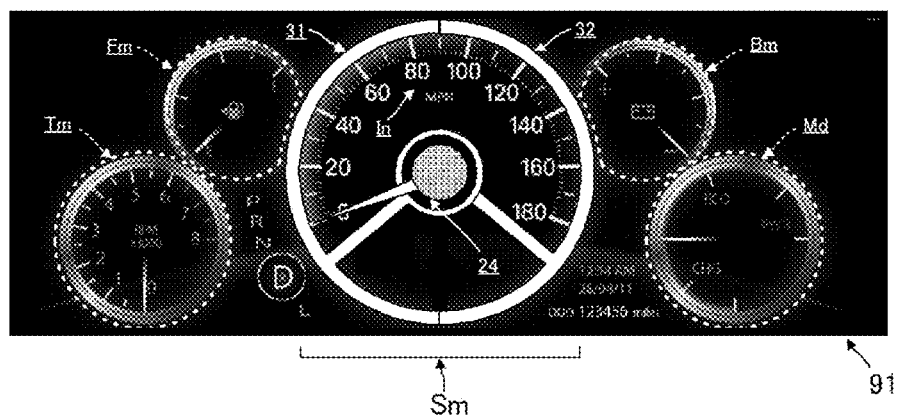
FIG. 8(a) is a view illustrating an example of a traveling screen display which is displayed by a display unit using the first pattern.
FIG. 8(b) is a view illustrating an example of a back monitor display which is displayed by the display unit using the second pattern.
Figure 8:
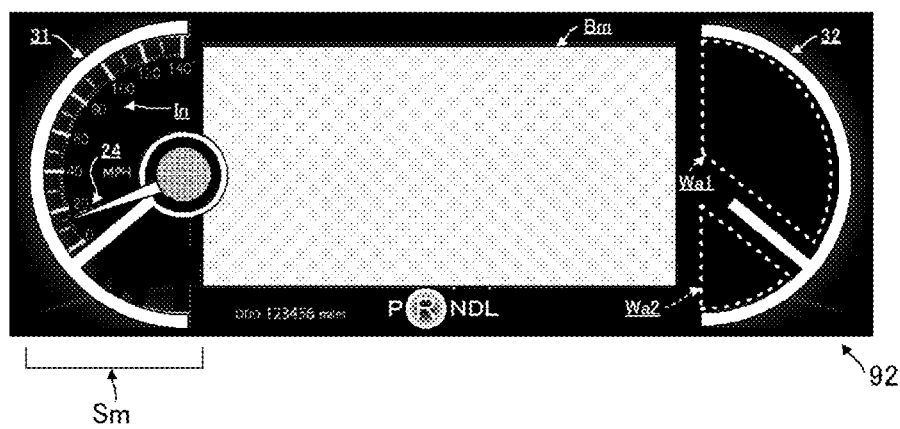
Figure 9:
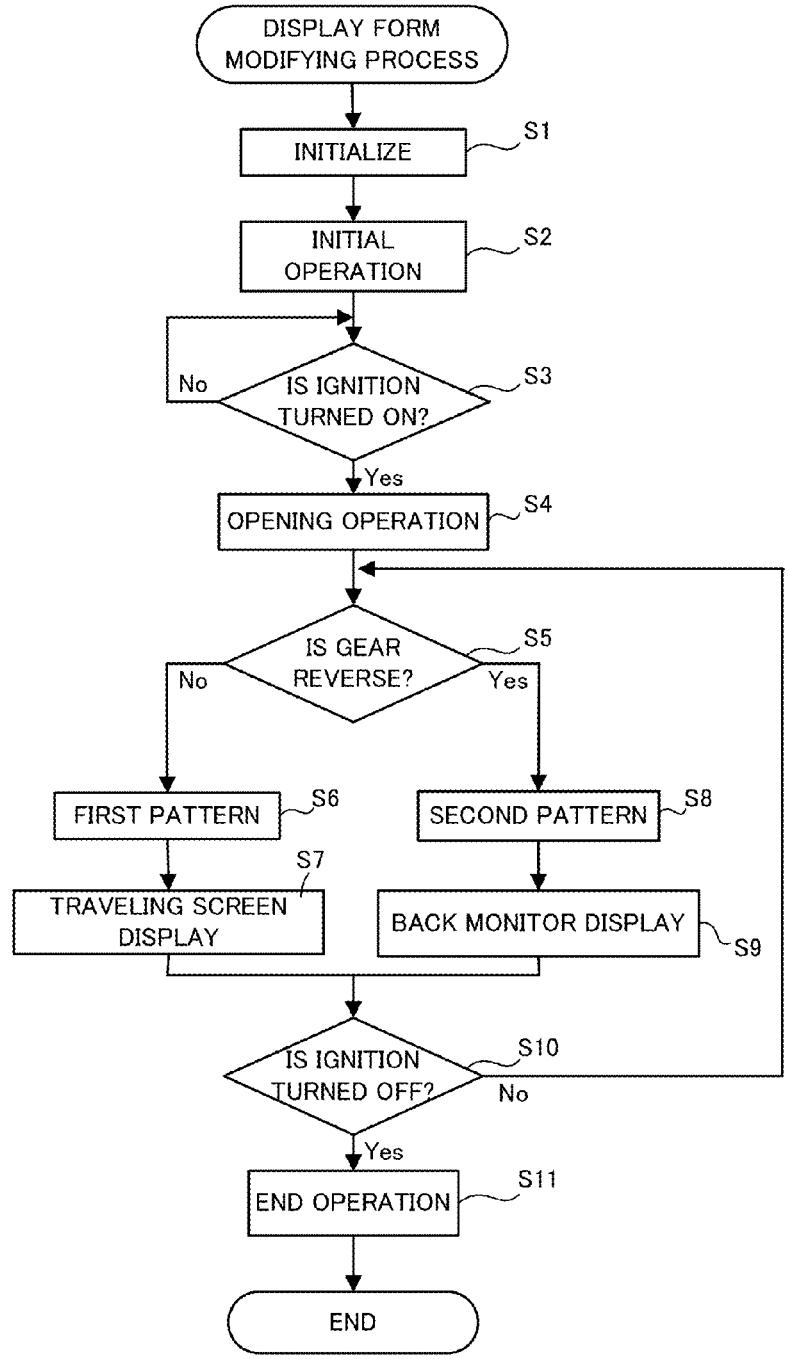
FIG. 9 is a flowchart illustrating a display form modifying process which is performed by a control unit.

The display unit 10 is, for example, a Thin Film Transistor (TFT) liquid crystal display unit of 12.3 inches, and displays a vehicle speed, the number of revolutions of an engine, the temperature of the engine, the amount of fuel remaining, various warnings, and the like under the control of a control unit 70 which will be described later. In addition, the display unit 10 changes a display state in accordance with the positional states (a "first pattern", a "second pattern", and the like which will be described later) of the pointer type gauge 20 and the framing unit 30 which move in the horizontal direction in a sliding manner (refer to FIGS. 8(a) and 8(b)). The movement of the pointer type gauge 20 and the framing unit 30 and the change of the display states performed by the display unit 10 will be described in detail later.

The display unit 10 includes a TFT liquid crystal panel, a polarizing plate, backlights, a display housing (not shown in the drawing), and the like, is attached to a fitting member (not shown in the drawing) which is formed in, for example, the case body 60, and is arranged and supported in a prescribed position.

Figure 3:
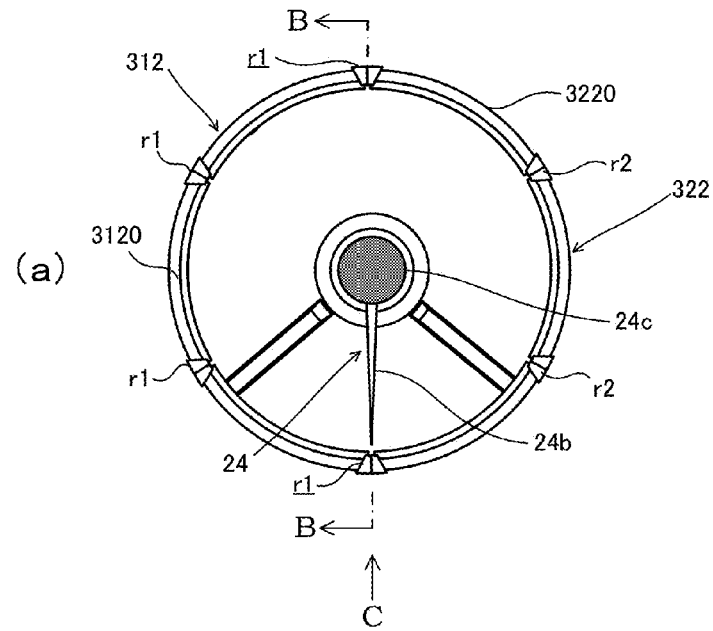
FIG. 3(a) is a view illustrating a needle unit and a framing unit when the display device of FIG. 1 is viewed from a front side.
FIG. 3(b) is a schematic sectional diagram illustrating a pointer type gauge taken along a line B-B of FIG. 3(a).
FIG. 3(c) is a side view illustrating the principal parts of the framing unit in an arrow C of FIG. 3(a).
Figure 3:
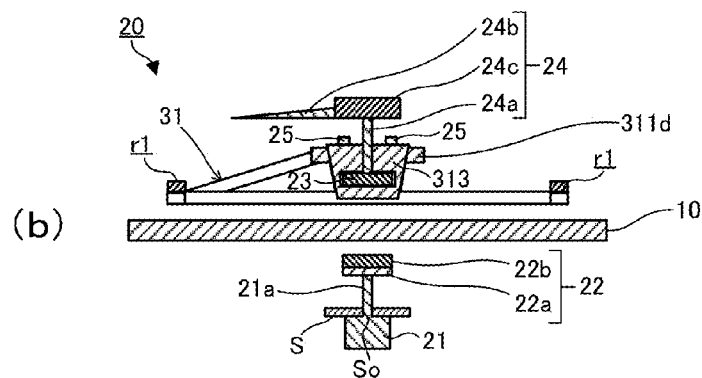
Figure 3:
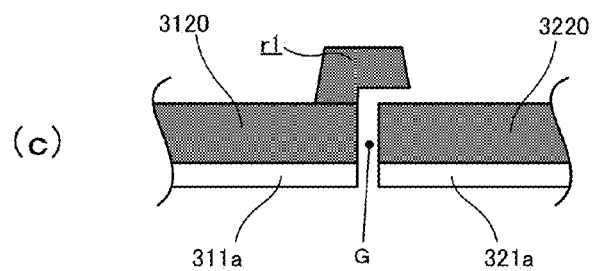

As shown mainly in FIGS. 2(b) and 3(b), the pointer type gauge 20 includes a needle driving part 21, a first magnet body 22, a second magnet body 23, a needle unit 24, light sources 25, and a conduction member 26. Meanwhile, as will be described later, the respective parts which configure the pointer type gauge 20 are attached to a first moving plate 411 directly or through a first component 31 of the framing unit 30 which is attached to the first moving plate 411. Therefore, the respective members move in accordance with the movement of the first moving plate 411.

The needle driving part 21 includes, for example, a stepping motor, and causes a rotating shaft 21a to rotate depending on a measured quantity (for example, vehicle speed) under the control of the control unit 70 which will be described later. As shown in FIG. 2(b), the needle driving part 21 is fixed to a substrate B which is attached to the back surface side of the first moving plate 411 which will be described later. The end portion of the rotating shaft 21a passes through a hole Bo which is provided in the substrate B and an opening 411a of the first moving plate 411 which will be described later, and is positioned immediately on the back of the display unit 10.

The first magnet body 22 is attached to the rotating shaft 21a, and rotates in accordance with the rotation of the rotating shaft 21a. As shown in FIG. 2(b), the first magnet body 22 which is attached as described above is positioned immediately on the back of the display unit 10. As shown in FIG. 3(b), the first magnet body 22 includes a yoke section 22a and a magnet section 22b on the side of the rotating shaft 21a, efficiently transmits magnetic force to the second magnet body 23, and causes the needle driving part 21 to hardly receive magnetic influence using the magnetic-permeable effect of the yoke section 22a.

The second magnet body 23 is rotatably supported by a pedestal 313 which will be described later, and is positioned in a position which is the front side of the display unit 10 and which is opposite to the first magnet body 22. The second magnet body 23 receives magnetic force which penetrates through the display unit 10 from the first magnet body 22, and rotates in accordance with the rotation of the first magnet body 22. In addition, the second magnet body 23 supports a needle shaft 24a of the needle unit 24 which will be described later.

The rotative power of the needle driving part 21 is transmitted to the needle unit 24 by the first magnet body 22 and the second magnet body 23, and thus the needle unit 24 can rotate. It is necessary for the display housing of the above-described display unit 10 to transmit magnetic force as above, and thus the display housing is formed of a non-magnetic material such as aluminum or the like.

The needle unit 24 is a needle member which integrally rotates with the second magnet body 23, and includes the needle shaft 24a, a light guiding needle 24b, and a needle cap 24c, as shown in FIG. 3(b).

The needle shaft 24a is pivotally supported by the second magnet body 23. The light guiding needle 24b is fixed to the needle shaft 24a, receives light emitted by the light sources 25 using a light receiving unit (not shown in the drawing) on the side of the needle shaft 24a, and emits light. The light guiding needle 24b is formed of a colorless or colored transparent light guiding material. The needle cap 24c is attached to the light guiding needle 24b in such a way as to cover a part of the light guiding needle 24b (which approaches the needle shaft 24a) from the front side of the axis direction of the needle shaft 24a. The needle cap 24c is a black cap which is formed of, for example, a synthetic resin, and does not transmit light.

Figure 4:
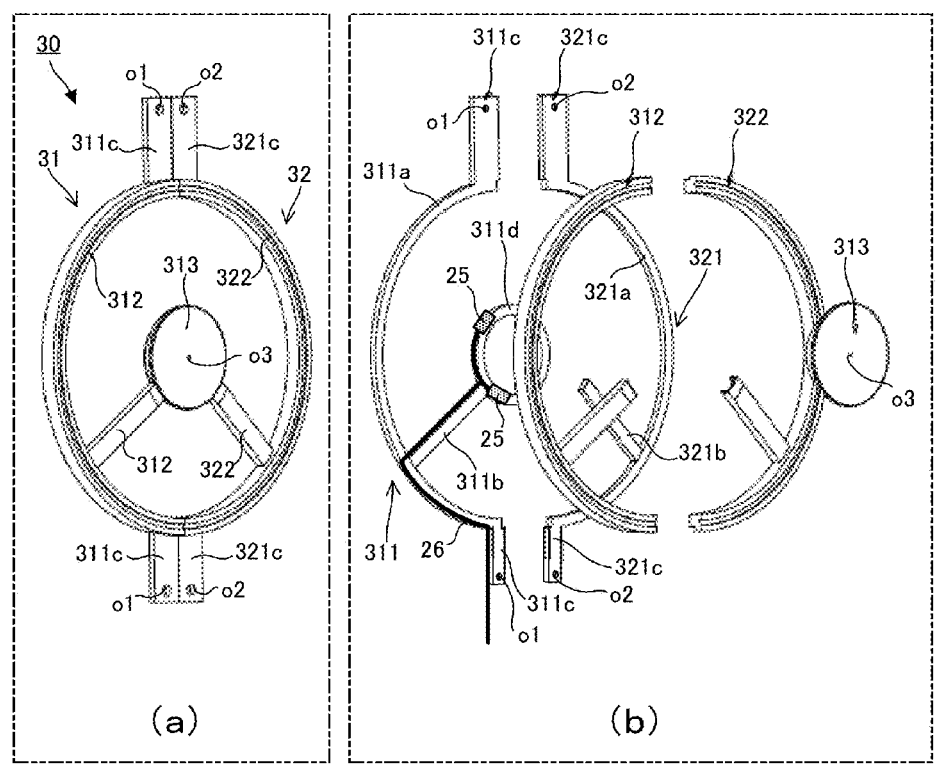
FIG. 4(a) is a perspective view illustrating the framing unit.
FIG. 4(b) is an exploded perspective view illustrating the framing unit of FIG. 4(a).

The light sources 25 are provided to be adjacent to the needle shaft 24a, and includes one or a plurality (for example, 2 or 3 lamps) of Light Emitting Diodes (LEDs). As shown in FIG. 4(b), the light sources 25 are attached to a light source attaching part 311d of the framing unit 30, which will be described later. The attached light sources 25 are positioned directly under the needle unit 24 (back side of the needle cap 24c), and illuminate the needle unit 24 (emit light toward the light receiving unit of the light guiding needle 24b). The light sources 25 emit light under the control of the control unit 70 which will be described later.

As shown in FIG. 4(b), the conduction member 26 includes, for example, a Flexible Printed Circuit (FPC), connects the light sources 25 to the control unit 70 (microcomputer 71) which will be described later, and transmits a control signal which is transmitted from the control unit 70 to the light sources 25. The conduction member 26 is attached to a first substrate 311 which will be described later as shown in the drawing.

As shown in FIG. 4(a), the framing unit 30 includes the first component 31 and a second component 32 which independently move in the horizontal direction in a sliding manner by the moving mechanism 40.

As shown in FIG. 4(b), the first component 31 is a component which moves together with the pointer type gauge 20 in a sliding manner, and includes the first substrate 311, a first framing cover 312, and the pedestal 313.

The second component 32 is positioned on the right side of the first component 31, and includes a second substrate 321 and a second framing cover 322 as shown in FIG. 4(b).

The first substrate 311 and the second substrate 321 are formed of, for example, a metal material, such as aluminum or stainless steel, and are formed through a press process, a cutting process, and the like.

The first substrate 311 includes a circular arc part 311a, an arm part 311b, an attaching part 311c, and a light source attaching part 311d.

The second substrate 321 includes a circular arc part 321a, an arm part 321b, and an attaching part 321c.

When the first substrate 311 approaches the second substrate 321 (refer to FIG. 5(a)), the circular arc parts 311a and 321a are formed to be a single circular shape (ring shape). That is, the circular arc part 311a of the first substrate 311 is formed to have a left half arc shape and the circular arc part 321a of the second substrate 321 is formed to have a right half arc shape based on a line which passes through the center of a circle of the circular shape in the vertical direction (hereinafter, the virtual line is referred to as a reference line).

The arm part 311b of the first substrate 311 is a member which is formed to extend from a part of the circular arc part 311a toward the center of the arc. In the same manner, the arm part 321b of the second substrate 321 is a member which is formed to extend from a part of the semicircular arc-shaped circular arc part 321a toward the center of the arc.

The arm part 311b and the arm part 321b are formed to be line symmetrical with respect to the reference line. In particular, the arm part 311b of the first substrate 311 has a function to guide the conduction member 26 to the light sources 25. More specifically, the conduction member 26 which has an end that is connected to the control unit 70 is attached along a part of the circular arc part 311a and, further, is attached along the arm part 311b, and thus the other end thereof is provided to reach the light sources 25 as shown in FIG. 4(b). In contrast, the arm part 321b of the second substrate 321 is formed as described above in response to a request for design. Therefore, the arm part 321b may be omitted.

The attaching parts 311c of the first substrate 311 are members which are formed to extend in the outer circumferential direction (vertical direction) of the circle from both ends of the circular arc part 311a, and include mounting holes o1. In the same manner, the attaching parts 321c of the second substrate 321 are members which are formed to extend in the outer circumferential direction (vertical direction) of the circle from both ends of the circular arc part 321a, and include mounting holes o2.

When the attaching parts 311c of the first substrate 311 are attached and fixed to the first moving plate 411 which will be described later, the first component 31 of the framing unit 30 moves in a sliding manner in accordance with the first moving plate 411 moving in a sliding manner. More specifically, the first component 31 is fixed to the first moving plate 411 using bolts or the like (not shown in the drawing) which pass through the mounting holes o1. In the same manner, when the attaching parts 321c of the second substrate 321 are attached and fixed to the second moving plate 421 which will be described later, the second component 32 of the framing unit 30 moves in a sliding manner in accordance with the second moving plate 421 moving in a sliding manner. More specifically, the second component 32 is fixed to the second moving plate 421 using bolts or the like (not shown in the drawing) which pass through the mounting holes o2. The movement in a sliding manner performed by each of the first moving plate 411 and the second moving plate 421 will be described later in detail.

The light source attaching part 311d is a circular-shaped (ring-shaped) member which is attached to the end of the arm part 311b. The above-described light sources 25 are attached to the light source attaching part 311d along the circular-shaped circumference. The center of the circle of the light source attaching part 311d substantially coincides with (including exactly coincides with) the center of a circle which is expressed when the circular arc parts 311a and 321a approach each other.

In the embodiment, the first substrate 311 and the second substrate 321 are formed to be line symmetrical with regard to the reference line except for the light source attaching part 311d which is included in the first substrate 311.

Each of the first framing cover 312 and the second framing cover 322 is an impermeable member which is formed of metal, synthetic resins, or the like. As shown in FIG. 3(a), the first framing cover 312 includes a main body part 3120 and a plurality of ribs r1, and the second framing cover 322 includes a main body part 3220 and a plurality of ribs r2.

Meanwhile, the ribs r1 and r2 are omitted in the drawings except for in FIG. 1, FIGS. 3(a) to 3(c), and FIG. 10(b).

The main body part 3120 of the first framing cover 312 is a member which is formed to correspond to the circular arc part 311a and the arm part 311b of the first substrate 311 (such that projection regions from the front side have substantially the same shape), and which is attached to the first substrate 311 such that both are covered from the front side.

The main body part 3220 of the second framing cover 322 is a member which is formed to correspond to the circular arc part 321a and the arm part 321b of the second substrate 321 (such that the projection regions from the front side have substantially the same shape), and which is attached to the second substrate 321 such that both are covered from the front side.

The plurality of ribs r1 are formed on the surface of the main body part 3120, and the plurality of ribs r2 are formed on the surface of the main body part 3220. For example, as shown in FIG. 3(a), the plurality of ribs r1 and r2 are positioned respectively at equivalent intervals along the circumferential direction of the circle which is expressed when the circular arc parts 311a and 321a approach each other.

In the embodiment, the number of ribs r1 and r2 is six in total. However, the ribs r1 and r2 are not assigned equally to the first framing cover 312 and the second framing cover 322. The first framing cover 312 includes four ribs r1 and the second framing cover 322 includes two ribs r2. In particular, when the first component 31 and the second component 32 approach each other, two ribs r1 (referential numerals are underlined in the drawing), which are positioned in the vertical direction (positioned in the closest positions to the second framing cover 322), of four ribs r1 of the first framing cover 312 are provided such that a part thereof wraps the main body part 3220 of the second framing cover 322 (overlaps when the display device 100 is viewed from the front side (viewed straight on)), as shown in FIG. 3(c). When the first component 31 and the second component 32 approach each other, the two ribs r1 which are positioned in the vertical direction do not come into contact with the surface of the main body part 3220 of the second framing cover 322.

In this way, when a ring shape is expressed using the first component 31 and the second component 32 (refer to FIG. 5(a)), it is possible to express a smooth ring shape without unintended intermittence (gaps) while both components do not come into contact with each other. In addition, since the ring shape is expressed while both components do not come into contact with each other, it is possible to suppress shock generated during movement, thereby leading to prevention of failure. In addition, impulsive sounds are not generated when both components collide with each other, thereby leading to prevention of noise.

In addition, the first framing cover 312 includes an impermeable member and covers the first substrate 311 provided with the conduction member 26 from the front side, and thus it is possible to hide the conduction member 26. In this manner, it is possible to attach the conduction member 26 such that the conduction member 26 is not viewed by the user. Meanwhile, in the embodiment, the impermeable member is used for the first framing cover 312. However, a semitransparent member may be used to an extent that the conduction member 26 is unnoticeable. The second framing cover 322 may also be a semitransparent member.

As shown in FIG. 4(b), the pedestal 313 is a member which is formed of a predetermined resin in, for example, a circular truncated conical shape, and which rotatably holds the second magnet body 23, and is attached to the light source attaching part 311d of the first substrate 31. A hollow storage space is formed in the pedestal 313, and the pedestal 313 rotatably holds and stores the second magnet body 23 using the storage space. A hole part o3 which has an opening diameter larger than a shaft diameter of the needle shaft 24a of the needle unit 24 is formed at a central part of the front-side surface (the base of a circular truncated cone) of the pedestal 313. The needle shaft 24a which is pivotally supported by the second magnet body 23 passes through the hole part o3.

As shown in FIG. 2(b), the moving mechanism 40 includes a first moving mechanism 41, a second moving mechanism 42, a slide mechanism 43, and a moving mechanism housing 44.

The first moving mechanism 41 is a mechanism to cause the first component 31 of the framing unit 30 (and the pointer type gauge 20) to move in the horizontal direction in a sliding manner.

The second moving mechanism 42 is a mechanism to cause the second component 32 of the framing unit 30 to move in the horizontal direction in a sliding manner.

The first moving mechanism 41 includes a first moving plate 411, a first driving part 412, a first transmission mechanism 413, and a first detecting unit 414.

The second moving mechanism 42 includes a second moving plate 421, a second driving part 422, a second transmission mechanism 423, and a second detecting unit 424.

The first moving plate 411 and the second moving plate 421 are members which are formed of, for example, a non-magnetic metal such as a resin material, aluminum, or the like.

The first moving plate 411 holds the pointer type gauge 20 and the first component 31 of the framing unit 30. In addition, the first moving plate 411 is attached to a timing belt 413c of the first transmission mechanism 413, which will be described later, through a sandwiched part n1 which is formed on the back surface thereof. An opening 411a is provided in the first moving plate 411 in order to cause the rotating shaft 21a of the needle driving part 21 to pass therethrough. The opening 411a is provided on the back surface side of the first moving plate 411 from the circumference, and a substrate attaching part C is formed (the substrate attaching part C may be a different body from the first moving plate 411). The above-described substrate B is attached to the substrate attaching part C, and the needle driving part 21 is attached to the substrate B, and thus the needle driving part 21 is fixed to the back side of the first moving plate 411.

The second moving plate 421 holds the second component 32 of the framing unit 30. In addition, the second moving plate 421 is attached to a timing belt 423c of the second transmission mechanism 423, which will be described later, through a sandwiched part n2 which is formed on the back surface thereof.

Each of the first driving part 412 and the second driving part 422 includes, for example, a stepping motor. The first driving part 412 causes the rotating shaft 412a to rotate under the control of the control unit 70 which will be described later. In the same manner, the second driving part 422 causes the rotating shaft 422a to rotate under the control of the control unit 70 which will be described later. The second driving part 422 is positioned above the first driving part 412 as shown in FIGS. 1 and 2(b).

The first transmission mechanism 413 and the second transmission mechanism 423 are arranged at a predetermined interval from each other in the vertical direction. When both are arranged in this manner, it is possible to prevent the display device 100 from being thick in the front and back directions. Therefore, the display device 100 can be thin. The first transmission mechanism 413 is positioned on the lower side of the second transmission mechanism 423.

The first transmission mechanism 413 includes two pulleys 413a and 413b which are arranged at a predetermined interval in the horizontal direction, and the timing belt 413c which is wound up by both the pulleys. As shown in FIG. 1, the pulley 413a is positioned on the right side when viewed from the front side of the display device 100, is press-fitted by the rotating shaft 412a of the first driving part 412 (may be fastened through a gear), and rotates in accordance with the rotation of the rotating shaft 412a. As shown in FIG. 1, the pulley 413b is positioned on the left side when viewed from the front side of the display device 100, and is rotatably held by an axis A1 (refer to FIG. 1) which is attached to the moving mechanism housing 44. The timing belt 413c is attached with predetermined tension such that the two pulleys 413a and 413b are not idle. Therefore, if the pulley 413a rotates, the pulley 413b also rotates in the same manner. In this manner, the first transmission mechanism 413 converts rotation power which is generated by the first driving part 412 into power in the slide direction (horizontal direction), thereby causing the first moving plate 411 which is attached to the timing belt 413c to move in a sliding manner, as described above.

The second transmission mechanism 423 includes two pulleys 423a and 423b which are arranged at a predetermined interval in the horizontal direction, and the timing belt 423c which is wound up by both the pulleys. As shown in FIG. 1, the pulley 423a is positioned on the right side when viewed from the front side of the display device 100, is press-fitted by the rotating shaft 422a of the second driving part 422 (may be fastened through a gear), and rotates in accordance with the rotation of the rotating shaft 422a. As shown in FIG. 1, the pulley 423b is positioned on the left side when viewed from the front side of the display device 100, and is rotatably held by an axis A2 (refer to FIGS. 1 and 2(a)) which is attached to the moving mechanism housing 44. The timing belt 423c is attached with predetermined tension such that the two pulleys 423a and 423b are not idle. Therefore, if the pulley 423a rotates, the pulley 423b also rotates in the same manner. In this manner, the second transmission mechanism 423 converts rotation power which is generated by the second driving part 422 into power in the sliding direction (horizontal direction), thereby causing the second moving plate 421 which is attached to the timing belt 423c to move in a sliding manner, as described above.

The first detecting unit 414, which is schematically shown in FIGS. 5(a) and 5(b), is used to detect the position of the first component 31 of the framing unit 30, includes, for example, a photoreflector (reflection type photo interrupter), and includes a first detecting part 414a and a first detection target 414b. In the same manner, the second detecting unit 424 is used to detect the position of the second component 32 of the framing unit 30, includes, for example, a photoreflector (reflection type photo interrupter), and includes a second detecting part 424a and a second detection target 424b.

The first detecting part 414a includes a light emitting element (infrared LED) which emits, for example, infrared light and a light receiving element (phototransistor), and supplies a detection signal to the control unit 70 which will be described later when the first detection target 414b is detected. The first detection target 414b is a reflection part which reflects, for example, infrared light, and is a detection target part of the first detecting part 414a. More specifically, if the first detecting part 414a which irradiates infrared light is positioned in a position facing the first detection target 414b, the first detection target 414b reflects infrared light which is emitted by the light emitting element of the first detecting part 414a toward the first detecting part 414a. Further, the first detecting part 414a detects the first detection target 414b by receiving the reflected light using the light receiving element, and supplies the detection signal to the control unit 70 through a sensor information input port 82.

Figure 5:
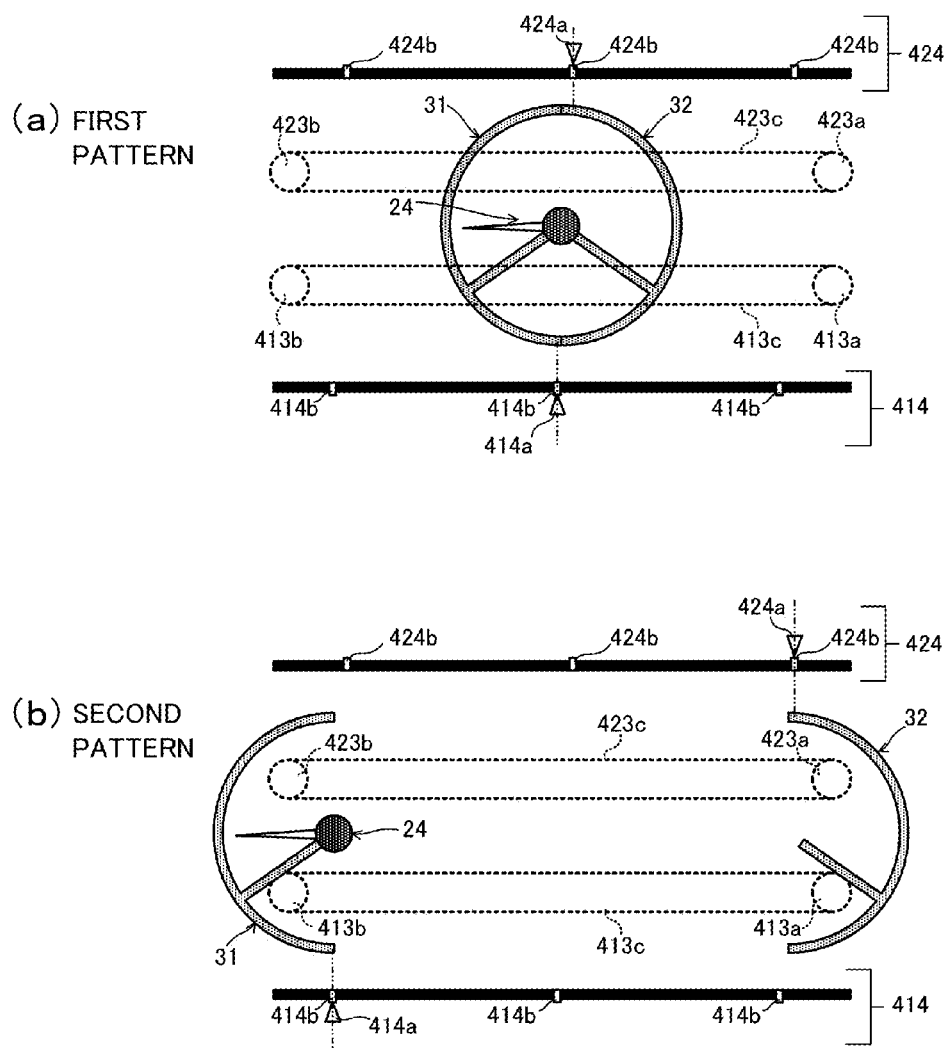
FIG. 5(a) is a view illustrating the framing unit in a state of a first pattern and a view illustrating first and second detecting units.
FIG. 5(b) is a view illustrating the framing unit in a state of a second pattern and a view illustrating the first and second detecting units.

The first detecting part 414a is attached to a predetermined position of the first moving plate 411. The first detection target 414b is used to determine the movement completion position of the first component 31. A plurality of first detection targets 414b are attached to positions which do not move like the first moving plate 411 (for example, predetermined positions of the moving mechanism housing 44). More specifically, as schematically shown in FIG. 5, for example, three first detection targets 414b are respectively arranged at predetermined intervals in the horizontal direction. The first detecting part 414a and the first detection targets 414b are respectively arranged at the same height in the vertical direction of the display device 100. If the first moving plate 411 moves in a sliding manner and the first detecting part 414a goes to a position facing any of the plurality of first detection targets 414b, the first detecting part 414a reacts thereto and detects that the first moving plate 411 is positioned in a prescribed position (that is, the first component 31 is present in the movement completion position). In this manner, the first detecting unit 414 detects the position of the first component 31 of the framing unit 30.

The second detecting part 424a includes a light emitting element (infrared LED) which emits, for example, infrared light and a light receiving element (phototransistor), and supplies a detection signal to the control unit 70 which will be described later when the second detection target 424b is detected. The second detection target 424b is a reflection part which reflects, for example, infrared light, and is the detection target part of the second detecting part 424a. A structure in which the second detecting part 424a detects the second detection target 424b is the same as that of the first detecting unit 414.

The second detecting part 424a is attached to a predetermined position of the second moving plate 421. The second detection target 424b is used to determine the movement completion position of the second component 32. A plurality of second detection targets 424b are attached to positions which do not move like the second moving plate 421 (for example, predetermined positions of the moving mechanism housing 44). More specifically, as schematically shown in FIG. 5, for example, the three second detection targets 424b are respectively arranged at predetermined intervals in the horizontal direction. The second detecting part 424a and the second detection targets 424b are respectively arranged at the same height in the vertical direction of the display device 100. If the second moving plate 421 moves in a sliding manner and the second detecting part 424a goes to a position facing any of the plurality of second detection targets 424b, the second detecting part 424a reacts thereto and detects that the second moving plate 421 is positioned in a prescribed position (that is, the second component 32 is present in the movement completion position). In this manner, the second detecting unit 424 detects the position of the second component 32 of the framing unit 30.

The first moving plate 411 and the second moving plate 421 stop (complete movement) based on the provision positions of the first detection target 414b and the second detection target 424b. Therefore, when each of the parts which are included in the first transmission mechanism 413 and the second transmission mechanism 423 expands and contracts due to change in temperature or is worn down, it is possible to perform accurate movement without deviation of positions acquired after movement. Accordingly, it is easy to align the first moving plate 411 and the second moving plate 421 with the display unit 10.

The slide mechanism 43 is a slide rail which guides the first moving plate 411 and the second moving plate 421 through the horizontal direction while suppressing the influence of frictional force as much as possible, and is attached to the moving mechanism housing 44. As shown in FIGS. 2(a) and 2(b), the slide mechanism 43 includes, for example, a ball bearing 43a and a rail part 43b which extends in the horizontal direction. In this case, a stainless steel ball bearing is used as the ball bearing 43a, and the rail part 44b is formed of stainless steel. Therefore, the slide mechanism, which enables slide resistance to be suppressed even when the temperature changes and vibration is generated, may be configured. Each of the first moving plate 411 and the second moving plate 421 includes a sliding part, which is not shown in the drawing, on back surface side thereof. When the sliding part causes the slide mechanism 43 to slide, the slide mechanism 43 is guided through the horizontal direction. The first moving plate 411 acquires the power of the first driving part 412 through the first transmission mechanism 413, thereby causing the slide mechanism 43 to slide. In addition, the second moving plate 421 acquires the power of the second driving part 422 through the second transmission mechanism 423, thereby causing the slide mechanism 43 to slide.

Meanwhile, in the embodiment, the slide mechanism 43 is described as a slide rail which is common to the first moving plate 411 and the second moving plate 412. However, an independent slide rail may be provided for each of the first moving plate 411 and the second moving plate 421.

The moving mechanism housing 44 is a housing which is common to the first moving mechanism 41 and the second moving mechanism 42, and is formed of, for example, a resin material or non-magnetic metal such as aluminum or the like.

Here, the movable range of each of the first moving mechanism 41 and the second moving mechanism 42 of the moving mechanism 40 will be described with reference to FIGS. 6(a) to 6(c).

For example, the first moving mechanism 41 causes the first component 31 to move in the horizontal direction in the display region of the display unit 10. In the embodiment, there are three stop positions (movement end positions) of the first component 31, that is, the left end part, the central part, and the right end part of the display region. The stop positions are prescribed by the provision positions of three first detection targets 414b. The movable range of the first moving mechanism 41 is a range in which the first component 31 moves from the left end part to the right end part of the display region, and is shown in FIG. 6(a) based on, for example, the left end of the first component 31.

The second moving mechanism 42 causes the second component 32 to move in the horizontal direction in, for example, the display region of the display unit 10. In the embodiment, there are three stop positions (movement end positions) of the second component 32, that is, the left end part, the central part, and the right end part of the display region. The stop positions are prescribed by the provision positions of three second detection targets 424b. The movable range of the second moving mechanism 42 is a range in which the second component 32 moves from the left end part to the right end part of the display region, and is shown in FIG. 6(b) based on, for example, the right end of the second component 32.

Figure 6:
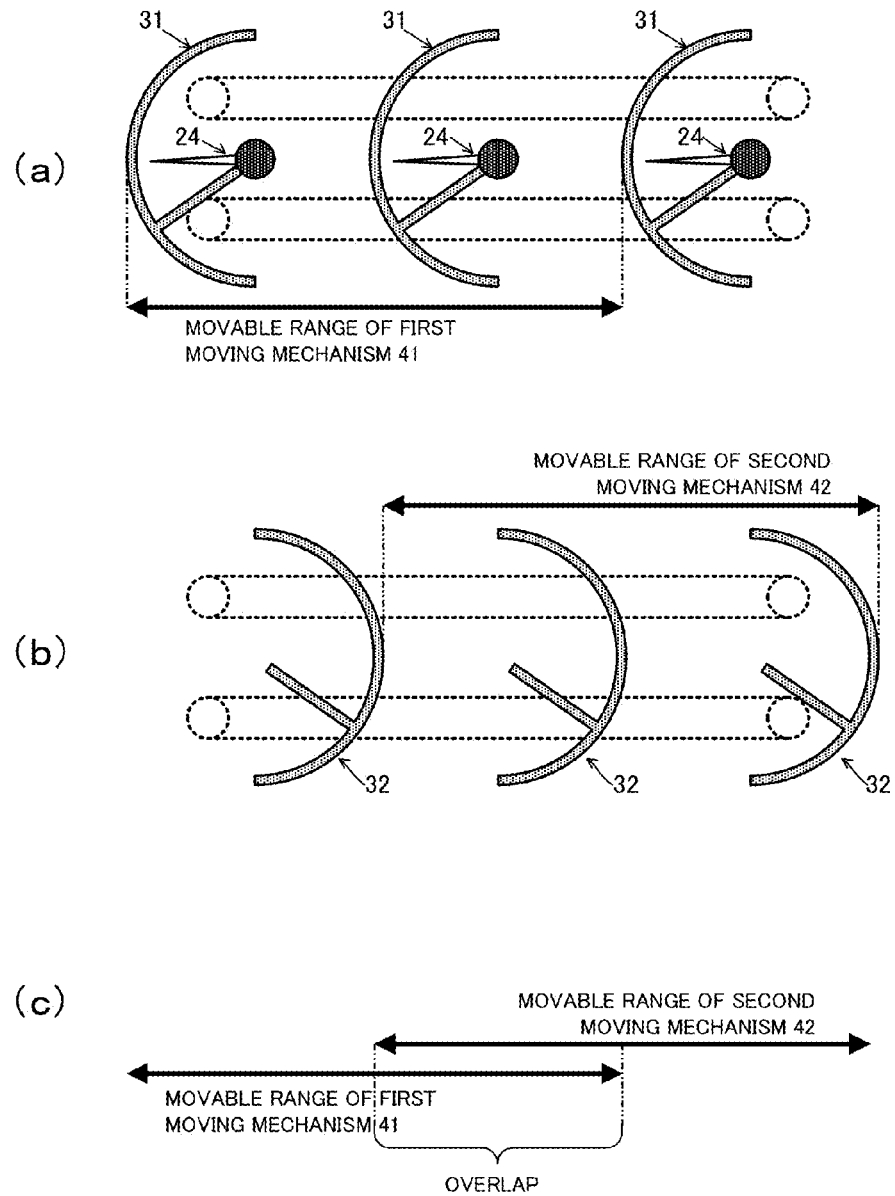
FIG. 6(a) is a view illustrating the movable range of a first moving mechanism.
FIG. 6(b) is a view illustrating the movable range of a second moving mechanism.
FIG. 6(c) is a view illustrating the relationship between the movable range of the first moving mechanism and the movable range of the second moving mechanism.

In the display device 100 according to the embodiment, the first transmission mechanism 413 and the second transmission mechanism 423 are configured such that some parts of the movable ranges of both the first moving mechanism 413 and the second moving mechanism 423 overlap (refer to FIG. 6(c)) by adjusting the first moving mechanism 413, the second moving mechanism 423, the first detecting unit 414, and the second detecting unit 424. As above, when configuration is made such that some parts of the movable ranges of the first component 31 and the second component 32 overlap, it is possible to increase the movable ranges thereof, and thus it is possible to change the state of the framing unit 30 to various states like first to third patterns which will be described later. In addition, it is possible to display various display forms by changing the display image of the display unit 10 in accordance with the change of the form of the framing unit.

The circuit substrate 50 is a circuit substrate acquired by mounting the control unit 70 which will be described later on the plate-shaped substrate, and is positioned on the back side of the moving mechanism 40. The circuit substrate 50 is supported inside the case body 60.

The case body 60 is a housing which stores each of the units (the display unit 10, the pointer type gauge 20, the framing unit 30, the moving mechanism 40, and the circuit substrate 50), and includes a storing body 61 and a transparent cover 62. The storing body 61 is a box-shaped member which includes a front-side opening, and the transparent cover 62 is attached to the opening.

Figure 7:
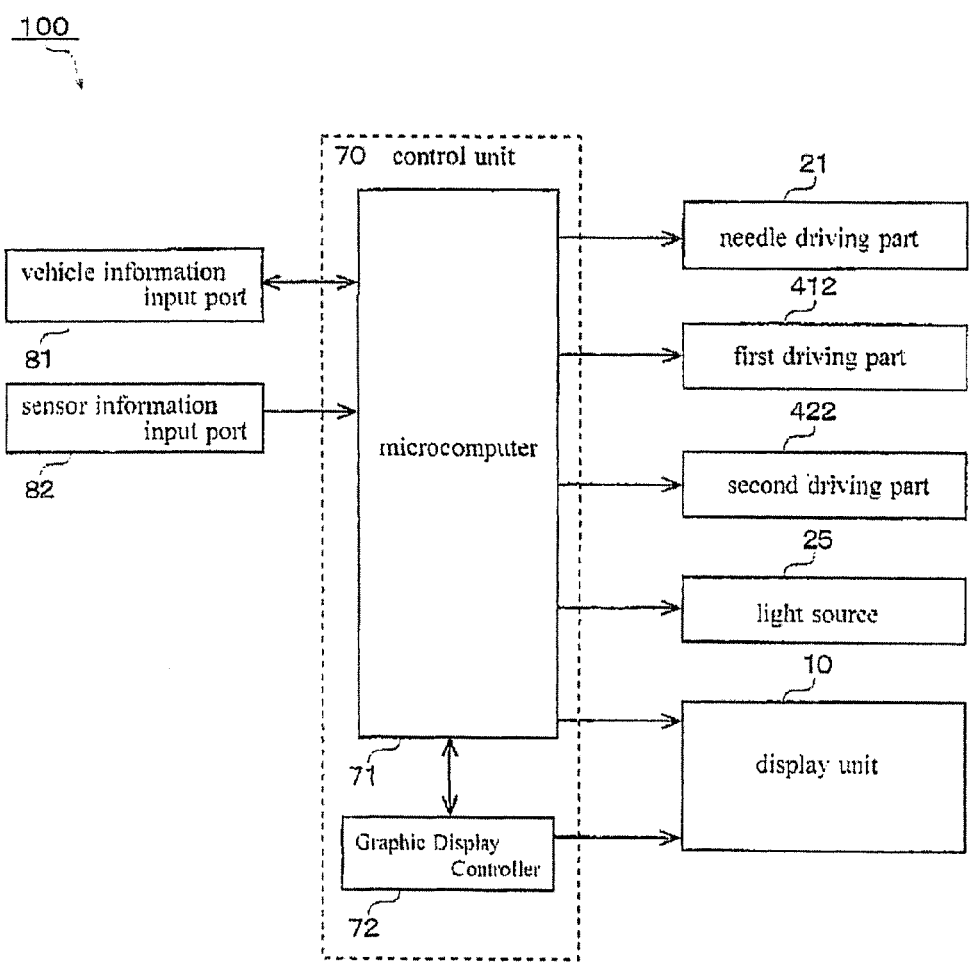
FIG. 7 is a block diagram illustrating electrical configurations of the display device according to the embodiment of the invention.

Subsequently, the electrical configuration of the display device 100 will be described with reference to FIG. 7.

The display device 100 includes the control unit 70, a vehicle information input port 81, the sensor information input port 82, the above-described display unit 10, the needle driving part 21, the light sources 25, a first driving part 412 and a second driving part 422.

The control unit 70 includes a microcomputer 71, a Graphic Display Controller (GDC) 72, and various driver Integrated Circuits (ICs, not shown in the drawing) which drive the needle driving part 21, the first driving part 412, the second driving part 422, and the back lights of the display unit 10. For example, the control unit 70 calculates various measured quantities, such as a vehicle speed, the number of revolutions of an engine, the temperature of the engine, the amount of fuel remaining, and the like, controls the operations of the display unit 10 and the pointer type gauge 20, and displays the calculated measured quantities.

The microcomputer 71 includes a Central Processing Unit (CPU), a Read Only Memory (ROM), a Random Access Memory (RAM), and an input and output interface, receives various pieces of information which are input from the vehicle information input port 81 and the sensor information input port 82, and supplies a control signal to each of the parts. The CPU of the microcomputer 71 reads and executes a predetermined program which is stored in, for example, a ROM in advance in order to perform a display form modifying process which will be described later.

The GDC 72 controls the display of the display unit 10 in cooperation with the microcomputer 71.

The vehicle information input port 81 is a port to which vehicle information, such as i) various pieces of state information transmitted from the Electronic Control Unit (ECU) of a vehicle through a communication line, ii) back monitor image information transmitted from the back camera, iii) operation signals indicative of operated content when a user operates operation switches in the vicinity of a handle, various control switches in the vicinity of an instrument panel, an input switch provided in the display device 100, or the like is input.

The sensor information input port 82 is a port to which a detection signal from the first detecting part 414a and the second detecting part 424a is input. The detection signal includes i) a detection signal acquired when the first detecting part 414a detects the first detection target 414b (that is, a signal which indicates that the first component 31 of the framing unit 30 is present in a prescribed position), and ii) a detection signal acquired when the second detecting part 424a detects the second detection target 424b (that is, a signal which indicates that the second component 32 of the framing unit 30 is present in a prescribed position).

The display device 100 which includes the above-described configuration uses prescribed information as a trigger, causes the first component 31 of the framing unit 30 (and the pointer type gauge 20) and the second component 32 to move in a sliding manner, respectively, modifies the framing unit 30 into a plurality of states, and changes the display of the display unit 10 to correspond to the states under the control of the control unit 70.

The display device 100 controls the driving of the moving mechanism 40 using the control unit 70, and modifies the framing unit 30 into a "first pattern" state in which the first component 31 and the second component 32 express a ring shape at the center of the display region of the display unit 10, and a "second pattern" state in which the first component 31 is positioned at the left end part of the display region and the second member 32 is positioned at the right end part of the display region, as shown in FIG. 5. Meanwhile, the change in the display of the display unit 10 to correspond to the states will be described later in detail.

As described above, the operation of the display device 100 is realized by performing a display form modifying process which is executed by the CPU of the control unit 70. Hereinafter, the process will be described with reference to FIG. 8.

(Display Form Modifying Process)

The display form modifying process starts on a condition that the control unit 70 receives a prescribed signal which is received through the vehicle information input port 81. The prescribed signal which functions as a start trigger is, for example, a signal which indicates that a door of a vehicle, in which the display device 100 is built, is open.

When the display form modifying process starts, the control unit 70 first performs an initializing operation to cause the first component 31 of the framing unit 30 (and the pointer type gauge 20) in the "first pattern" state (refer to FIG. 5(a)) to move to the left end and cause the second component 32 to move to the right end (that is, the framing unit 30 is caused to be the "second pattern" state (refer to FIG. 5(b))) (step S1) when a previous display form modifying process ends.

More specifically, the control unit 70 controls the driving of the first driving part 412, and causes the first moving plate 411 to move in the left direction in a sliding manner. Further, if the control unit 70 detects that the first moving plate 411 is positioned at the left end part in cooperation with the first detecting unit 414 (that is, if a detection signal which is supplied from the first detecting part 414a is received when the first detecting part 414a is positioned in a position facing the first detection target 414b, which is positioned at the left end part, of three first detection targets 414b), the control unit 70 stops the rotation operation of the first driving part 412, and sets a stop position (detected position) to an original point (reference position) of the first moving plate 411 in a current operation. At the same time, the control unit 70 controls the driving of the second driving part 422, and causes the second moving plate 421 to move in the right direction in a sliding manner. Further, if the control unit 70 detects that the second moving plate 421 is positioned at the right end part in cooperation with the second detecting unit 424 (that is, if a detection signal which is supplied from the second detecting part 424a is received when the second detecting part 424a is positioned in a position facing the second detection target 424b, which is positioned at the right end part, of the three second detection targets 424b), the control unit 70 stops the rotation operation of the second driving part 422, and sets a stop position (detected position) to an original point (reference position) of the second moving plate 421 in a current operation.

Then control unit 70 performs such an initializing process in step S1.

Subsequently, the control unit 70 performs an initial operation to set the framing unit 30 to the "first pattern" state (step S2).

More specifically, the control unit 70 controls the driving of the first driving part 412, and causes the first moving plate 411 to move in the right direction in a sliding manner. Further, if the control unit 70 detects that the first moving plate 411 is positioned at the central part in cooperation with the first detecting unit 414 (that is, if a detection signal which is supplied from the first detecting part 414a is received when the first detecting part 414a is positioned in a position facing the first detection target 414b, which is positioned at the central part, of three first detection targets 414b), the control unit 70 stops the rotation operation of the first driving part 412. At the same time, the control unit 70 controls the driving of the second driving part 422, and causes the second moving plate 421 to move in the left direction in a sliding manner. Further, if the control unit 70 detects that the second moving plate 421 is positioned at the central part in cooperation with the second detecting unit 424 (that is, if a detection signal which is supplied from the second detecting part 424a is received when the second detecting part 424a is positioned in a position facing the second detection target 424b, which is positioned at the central part, of the three second detection targets 424b), the control unit 70 stops the rotation operation of the second driving part 422.

The control unit 70 performs the initializing operation to set the framing unit 30 to the "first pattern" state as described above.

Meanwhile, in the first pattern state, the first component 31 approaches the second component 32 while the first component 31 does not come into contact with the second component 32. Therefore, as shown in FIG. 3(c), a gap part G is formed between the first component 31 and the second component 32. The gap part G is provided to prevent the first component 31 from coming into contact with the second component 32 due to the movement precision error of the moving mechanism 40 or due to slight movement generated by a reaction when the moved first moving plate 411 and the second moving plate 421 stop. The display device 100 is configured such that the gap part G is formed by appropriately adjusting the first detecting unit 414, the second detecting unit 424, and the like. In addition, in the embodiment, when the display device 100 is viewed from the front side (viewed straight on), the rib r1 which conceals the gap part G using the first component 31 is formed as described above, thereby realizing a ring shape without intermittence (gaps) when the first component 31 approaches the second component 32.

Subsequently, the control unit 70 determines whether or not an ignition is turned on (step S3). When a signal which indicates that the ignition is turned on is received through the vehicle information input port 81, the control unit 70 determines that the ignition is turned on (step S3; Yes), and the process proceeds to step S4. On the other hand, when it is determined that the ignition is not turned on (step S3; No), the process in step S3 is performed again. In this case, the control unit 70 waits until the signal which indicates that the ignition is turned on is received.

In step S4, the control unit 70 performs an opening operation. The opening operation is, for example, an operation to display a prescribed opening image on the display unit 10, to sweep the needle unit 24 of the pointer type gauge 20, or to turn on or off the light sources 25 or the back lights of the display unit 10.

Subsequently, the control unit 70 determines whether or not a gear is a reverse gear (back gear) (step S5). More specifically, when the control unit 70 receives a signal which indicates that the gear is shifted to the reverse gear through the vehicle information input port 81, the control unit 70 determines that the gear is the reverse gear (step S5; Yes) and performs a process in step S8. When it is determined that the gear is not the reverse gear (step S5; No), the control unit 70 performs a process in step S6.

In step S6, the control unit 70 controls the first driving part 412 and the second driving part 422, and sets the framing unit 30 to the "first pattern" state. More specifically, a control method which is the same as in step S2 is used. Meanwhile, when the framing unit 30 is currently in the "first pattern" state already, the control unit 70 maintains the state.

Subsequently, the microcomputer 71 of the control unit 70 sets the display of the display unit 10 to the display of a traveling screen in cooperation with the GDC 72 (step S7). The display of the traveling screen is a display, for example, to cause various measured quantities to be displayed on the display unit 10 and the pointer type gauge 20 on the lower side of a traveling screen 91 as shown in FIG. 8A depending on vehicle information which is received through the vehicle information input port 81. More specifically, when the traveling screen display is performed, the display unit 10 displays a tachometer Tm which indicates the number of revolutions of an engine, a fuel meter Fm which indicates the amount of fuel remaining, a battery meter Bm which indicates remaining battery, a mode display Md which indicates a traveling mode, a speed meter index part In (an example of a notification image), and the like in the display region thereof as the traveling screen 91. As shown in the drawing, the speed meter index part In includes numerical values, graduations, figures, and the like which are displayed inside the ring shape of the framing unit 30 (the "first pattern" state) which is positioned at the central part of the display region. A vehicle speed meter Sm is expressed by the index part In, the pointer type gauge 20, and the framing unit 30 in the first pattern state. In this case, gauges other than the vehicle speed meter Sm are displayed in digits which are displayed on the display unit 10. However, the vehicle speed meter Sm is expressed by the analog pointer type gauge 20 (and the framing unit 30) and the index part In which is displayed in digits on the display unit 10. That is, the framing unit 30 functions as the frame of the vehicle speed meter Sm, and the display unit 10 displays the numerical values, the graduations, and the like as the notification image to notify of the vehicle speed along the frame (in accordance with the form of the framing unit 30). Meanwhile, when the framing unit 30 is currently in a traveling screen display state already, the control unit 70 maintains the state.

When the control unit 70 performs the processes in steps S6 and S7, the process proceeds to step S10.

In step S5, when it is determined that the gear is the reverse gear (step S5; Yes), the control unit 70 controls the first driving part 412 and the second driving part 422, and sets the framing unit 30 to the "second pattern" state (step S8). More specifically, a control method which is the same as in step S1 is used. Meanwhile, when the framing unit 30 is currently in the "second pattern" state already, the control unit 70 maintains the state.

Subsequently, the microcomputer 71 of the control unit 70 sets the display of the display unit 10 to the display of a back monitor in cooperation with the GDC 72 (step S9). The display of the back monitor, for example, causes the various measured quantities to be displayed on the display unit 10 and the pointer type gauge 20 on the lower side of a back monitor screen 92 as shown in FIG. 8(b) depending on the vehicle information which is received through the vehicle information input port 81. More specifically, in the display of the back monitor, the display unit 10 displays i) the index part In (an example of the notification image) which includes speed meter numerical values, graduations, figures, and the like in accordance with the half arc shape inside the first component 31 of the framing unit 30 which is positioned at the left end part of the display region in the display region thereof as the back monitor screen 92, displays ii) warning signs Wa1 and Wa2 (an example of the notification image) in accordance with the half arc shape inside the second component 32 which is positioned at the right end part of the display region, and displays iii) a back monitor Bm (an example of the prescribed image or the notification image) in a rectangular region which appears between the first component 31 and the second component 32 which are open on the right and left sides.

The back monitor Bm is built in a vehicle rear part, and projection images of back cameras (not shown in the drawing) which image outside are projected thereon. The warning signs Wa1 and Wa2 include, for example, a warning sign displayed when an obstacle approaches in a case in which a vehicle moves back, a warning sign which provides notification to a driver that the vehicle currently moves back. In addition, the vehicle speed meter Sm is expressed by the index part In, the pointer type gauge 20, and the first component 31 of the framing unit 30 which is in the second pattern state. In this case, the first component 31 functions as the frame of the vehicle speed meter Sm, and the display unit 10 displays the numerical values, the graduations, and the like as the notification image to notify of the vehicle speed along the frame (in accordance with the form of the first component 31). In addition, the second component 32 functions as the frame of the gauge which displays the warning signs Wa1 and Wa2, and the display unit 10 displays the notification image to notify of warning information as the warning signs Wa1 and Wa2 in accordance with the form of the frame. Meanwhile, when the framing unit 30 is currently in the back monitor display state already, the control unit 70 maintains the state.

If the control unit 70 performs the processes in steps S8 and S9, the process proceeds to step S10.

In step S10, the control unit 70 determines whether or not the ignition is turned off. When a signal which indicates that the ignition is turned off is received through the vehicle information input port 81, the control unit 70 determines that the ignition is turned off (step S10; Yes), and the process proceeds to step S11. On the other hand, when it is determined that the ignition is not turned off (step S10; No), the process returns to step S5.

In step S11, the control unit 70 performs an end operation to set the framing unit 30 to the "first pattern" state. More specifically, a control method is the same as in step S2. Meanwhile, when the framing unit 30 is currently in the "first pattern" state already, the control unit 70 maintains the state.

When the process in step S11 is performed, the control unit 70 ends the display form modifying process.

In the above-described display form modifying process, the display device 100 displays various pieces of information in two display states (the traveling screen display and the back monitor display) by changing the framing unit 30 into the first and second pattern states and by displaying images, which differ depending on before and after the change in the patterns, on the display unit 10. However, the display states of the display device 100 are not limited thereto. For example, the display device 100 can cause the display unit 10 to display radio display as shown in FIG. 10(b) while causing the first member 31 and the second member 32 to move to the left end part in the display region of the display unit 10 and setting the display state to a "third pattern" state (refer to FIG. 10(a)) in which the ring shape is expressed using both the members.

With regard to the radio display, for example, the display unit 10 displays the speed meter index part In (an example of the notification image) and a warning sign Wa3 (an example of the notification image), which indicates whether or not a side break is applied, as the radio display screen 93 in accordance with the ring shape of the framing unit 30 which is positioned on the left side of the display region, and displays a radio display image Rd in the right-side region of the display region which is empty due to the movement of the framing unit 30. The traveling screen display (FIG. 8(a)), the back monitor display (FIG. 8(b)), or the like is switched to the radio display on a condition that the control unit 70 receives a signal, which indicates operation content transmitted when a user selects radio using various control switches in the vicinity of an instrument panel.

In addition, the display device 100 may display a car navigation image (an example of a second notification image) in the region, which corresponds to a space formed when the first component 31 and the second component 32 are open on the right and left sides, of the display region of the display unit 10 in the second pattern state (refer to FIG. 5(*b*)).

Figure 10:
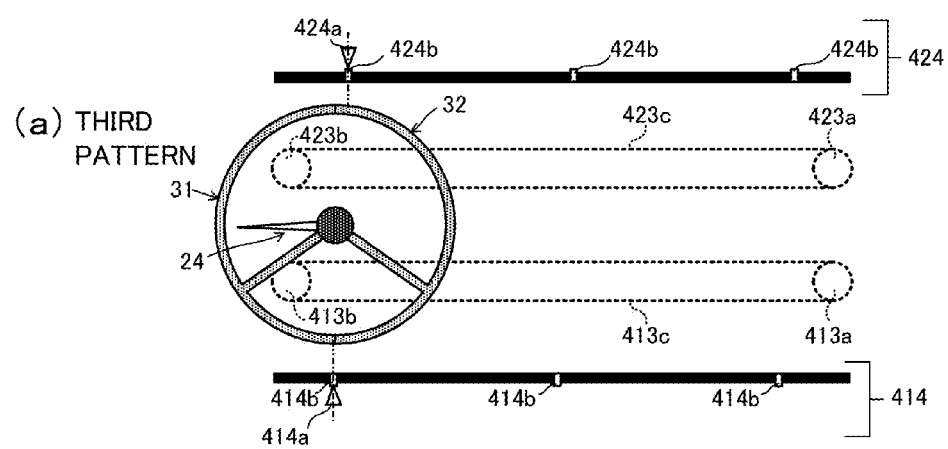
FIG. 10(a) is a view illustrating the framing unit in a state of a third pattern.
FIG. 10(b) is a view illustrating an example of a radio display which is displayed by the display unit using the third pattern.
Figure 10:
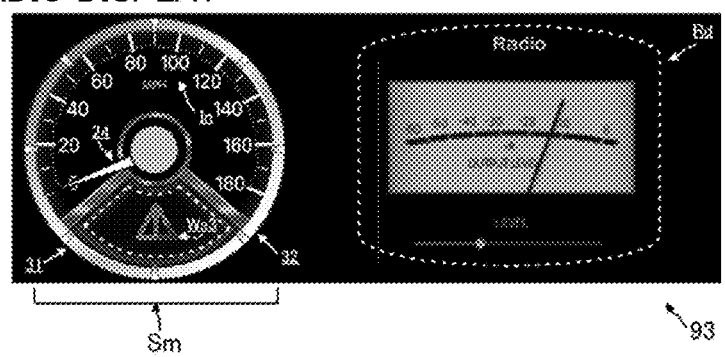

In addition, when the display device 100 expresses the ring shape at the left end part of the display region (third pattern state (refer to FIG. 10(*a*))) by moving the framing unit 30, the display device 100 may display information related to a vehicle right side (for example, information about the right side components of the vehicle, such as an image of the right side of the outside of the vehicle, an indicator which notify of the open state of a right door, abnormality of right tire pressure, or the like) in the right-side region of the display region which is empty because the framing unit 30 is moved. If so, since the information is displayed so as to link with a sense of direction of the user (mostly, a driver), the user can intuitively and easily grasp the displayed information. In the same manner, when the display device 100 expresses the ring shape at the right end part of the display region, by moving the framing unit 30, the display device 100 may display information related to a vehicle left side in the left-side region of the display region which is empty because the framing unit 30 is moved.

In addition, the display device 100 may cause the framing unit 30 to move from one end of the display region to the other end while maintaining the ring shape. Therefore, it is possible to effectively cause the user to observe the display device 100 or to perform a new operation.

The display device 100 according to the embodiment includes the display unit 10 (an example of the display part) that displays a display image including a notification image to notify of the state of the vehicle in the display region, the framing unit 30 (an example of the frame body) that is positioned on the display region of the display unit 10 and includes the first component 31 and the second component 32, and the moving mechanism 40 (an example of the movement unit) that causes at least one of the first component 31 and the second component 32 to move. Segmentation is performed on the framing unit 30 in such a way that at least one side of the first component 31 and the second component 32 is moved by the movement unit. Before the segmentation is performed, the framing unit 30 surrounds one of the display regions of the display unit 10. The display unit 10 displays the display image which differs depending on before and after the segmentation is performed on the framing unit 30, and displays the notification image in accordance with the form of the framing unit 30 at least one of before and after the segmentation is performed on the framing unit 30. According to the display device 100, since it is possible to change the display image in accordance with the movement position of the framing unit 30, it is possible to realize a new display.

In addition, segmentation is performed on the framing unit 30 in the horizontal direction based on a fact that the movement direction of the first component 31 and the second component 32 is the horizontal direction when viewed from an observer of the display device 100. Therefore, it is possible to cause the framing unit 30 to move in a wide range in the display region of the display unit for a vehicle in which the horizontal direction is a long direction in many cases, and it is possible to display various state images using the regions which are formed in accordance with the movement of the framing unit 30 while realizing a new display.

In addition, before segmentation is performed on the framing unit 30, the first component 31 and the second component 32 of the framing unit 30 approach each other while the first component 31 does not come into contact with the second component 32, the gap part G is formed between the first component 31 and the second component 32 which approach each other, and the rib r1 which conceals the gap part G is formed on the first component 31. Therefore, when the display device 100 is viewed straight on and a first form (ring shape) is expressed by the first component 31 and the second component 32, it is possible to express the smooth first form without the generation of unintended intermittence (gaps). Since both the components do not come into contact with each other, it is possible to suppress shock from being generated during movement, thereby leading to prevention of failure. In addition, impulsive sounds are not generated when both the components collide with each other, thereby leading to prevention of noise.

The display device 100 according to the embodiment includes the display unit 10 (an example of the display part) that displays a display image including a notification image to notify of the state of a vehicle in the display region, the first component 31 and the second component 32 that are positioned on the display region of the display unit 10, the first transmission mechanism 413 (an example of the first mechanism) that causes the first component 31 (an example of a first movable member) to move in a first movable range in the first direction (horizontal direction), and the second transmission mechanism 423 (an example of the second mechanism) that causes the second component 32 (an example of a second movable member) to move in a second movable range, at least a part of which overlaps with the first movable range, along the first direction. After at least one side of the first component 31 and the second component 32 moves, the display unit 10 displays the display image which is different from that acquired before the movement occurs. According to the display device 100, it is possible to increase the movement ranges of the first component 31 and the second component 32 and it is possible to display different display images in accordance with the movement of both the components, and thus it is possible to perform the display in various display states.

In addition, the first transmission mechanism 413 and the second transmission mechanism 423 are positioned in the direction (vertical direction) which is perpendicular to the movement direction (horizontal direction) of the first component 31 and the second component 32, at a predetermined interval from each other. Therefore, it is possible to provide the display device 100 with suppressed thickness in the front and back directions.

Meanwhile, the invention is not limited to the above-described embodiment, a modification example below, and the drawings. It is apparent that addition of appropriate changes (including removal of components) is possible.

Modification Example

Figure 11:
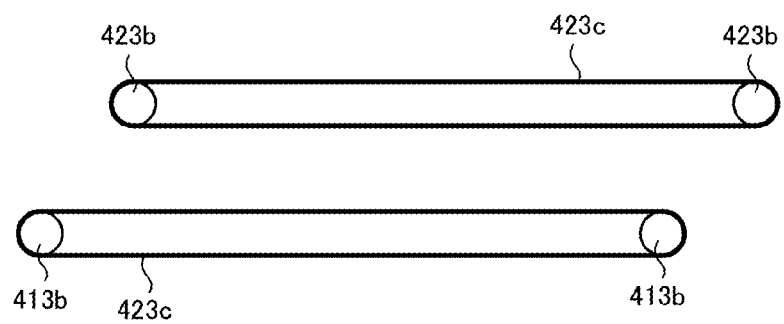
FIG. 11 is a view illustrating the first transmission mechanism and the second transmission mechanism of a display device according to a modification example.

In the above embodiment, the example in which the first transmission mechanism 413 and the second transmission mechanism 423 are arranged in the horizontal direction without deviation is shown. However, the invention is not limited thereto. As shown in FIG. 11, both transmission mechanisms may be arranged to deviate in the horizontal direction. If the display device 100 is configured such that at least some parts of the movable range of the first moving mechanism 41 which includes the first transmission mechanism 413 overlap with the movable range of the second moving mechanism 42 which includes the second transmission mechanism 423 even when both the transmission mechanisms deviate from each other, it is possible to increase the movable ranges, and thus it is possible to perform the display in various display states.

In addition, in the above embodiment, since the display device 100 is configured to be thin in the front and back directions, the example in which the first transmission mechanism 413 and the second transmission mechanism 423 are respectively arranged at a predetermined interval in the vertical direction is shown. However, the invention is not limited thereto. When there is a request for design, it is possible to configure the display device by arranging each of the mechanisms at a predetermined interval in the front and back direction.

In addition, in the above embodiment, the example in which the framing unit 30 is moved in the horizontal direction by the moving mechanism 40 is shown. The reason for this is that, since the long direction of the display device 100 according to the embodiment is the horizontal direction, it is possible to increase the movable ranges in the display region of the display device 100 when the framing unit 30 is moved in the horizontal direction. However, the movement direction is not limited thereto and the movement direction may be the vertical direction, the oblique direction, or the like. It is possible to appropriately modify the movement direction by taking the form of the display device into consideration.

In addition, in the above embodiment, the example in which the framing unit 30 moves in the display region of the display unit 10 is shown. However, the invention is not limited thereto. A newer display state may be possible in such a way that a part of the framing unit 30 moves to protrude from the display unit 10 or the entire framing unit 30 moves up to the outside of the display unit 10.

In addition, in the above embodiment, three movement completion positions of the first moving plate 411 (first component 31) are prescribed by arranging three first detection targets 414b, and three movement completion positions of the second moving plate 421 (second component 32) are prescribed by arranging three second detection targets 424b. However, the invention is not limited thereto. The movement completion positions may be prescribed by arranging two or four or more first detection targets 414b and second detection targets 424b.

In the above embodiment, the example in which the display device 100 includes the substantial pointer type gauge 20 is shown. However, the invention is not limited thereto. The display device may display needles in the display unit 10 or display numerical values (measured values) without including substantial needles.

In addition, in the above embodiment, the example in which a circular shape (ring shape) is made when the first component 31 of the framing unit 30 approaches the second component 32 is shown. However, the invention is not limited thereto. A part of the display region may be surrounded in such a way that an elliptical shape, a rectangular shape, or a polygon is made when the first component approaches the second component, and a part of the display region may be surrounded with a form in which some parts of sides are chipped when the first component approaches the second component.

In addition, in the above embodiment, the example in which the framing unit 30 is segmented into two components (first component 31 and second component 32) due to movement is shown. However, the invention is not limited thereto. Three or more components may be acquired through segmentation.

In addition, in the above embodiment, the example in which, when the first component 31 approaches the second component 32 and when the display device 100 is viewed from the front side (viewed straight on), two ribs which cover the gap part G are two ribs r1 which are provided together in the first framing cover 312 is shown. However, the invention is not limited thereto. The two ribs which cover the gap part G may be provided together in the second framing cover 322, or one of the two ribs which cover the gap part G as described above may be provided in the first framing cover 312 and the other one may be provided in the second framing cover 322.

In addition, in the above embodiment, the example in which the second magnet body 23 is rotated by the magnetic force of the first magnet body 22 attached to the needle driving part 21 is shown. However, the invention is not limited thereto.

Configuration may be made such that the second magnet body 23 is wound up by a pair of coils, and the second magnet body 23 is rotated by applying electricity to the pair of coils (that is, the needle unit 24 is rotated). The pair of coils is connected to the control unit 70 through the conduction member, similarly to, for example, the light sources 25. In this case, the needle driving part 21, the first magnet body 22, and the substrate B (refer to FIGS. 2(b) and 3(b)) are not necessary.

In the above embodiment, the example in which the display device is a vehicle gauge which is built in a vehicle is shown. However, the invention is not limited thereto. The display device may be a gauge which is built in a watercraft, farm machinery, an aircraft, a ship, an electric train, or the like.

INDUSTRIAL APPLICABILITY

The invention can be applied to a display device that includes a display part which displays a display image including a notification image to notify of the state of a vehicle in a display region, a frame body which is positioned on the display region of the display part and configured to include a plurality of components, and a movement unit which causes at least one component of the plurality of components of the frame body to move.

REFERENCE SIGNS LIST 100 display device
10 display unit
20 pointer type gauge
21 needle driving part
22 first magnet body
23 second magnet body
24 needle unit
25 light source
26 conduction member
30 framing unit
31 first component
311 first substrate
312 first framing cover
313 pedestal
32 second component
321 second substrate
322 second framing cover
40 moving mechanism
41 first moving mechanism
411 first moving plate
412 first driving part
413 first transmission mechanism
414 first detecting unit
42 second moving mechanism
421 second moving plate
422 second driving part
423 second transmission mechanism
424 second detecting unit 43 slide mechanism
44 moving mechanism housing
50 circuit substrate
60 case body
70 control unit
81 vehicle information input port
82 sensor information input port

The invention claimed is:

1. A display device which is loaded on a vehicle, comprising:
- a display part that displays a display image which includes a notification image to notify a state of the vehicle in a display region;
- a frame body that is positioned on the display region of the display part, and is configured to include a plurality of components; and
- a movement unit that causes at least one component of the plurality of components to move, wherein
- the frame body is segmented in such a way that at least the one component is moved by the movement unit, and is configured to surround one region of the display region of the display part before segmentation is performed, and
- the display part displays the display image which differs depending on before and after the segmentation is performed on the frame body, and displays the notification image in accordance with a form of the frame body at least one of before and after the segmentation is performed on the frame body.

2. The display device according to claim 1,
wherein, before the segmentation is performed on the frame body, the display part displays the notification image in accordance with the form of the frame body in the one region which is surrounded by the frame body.

3. The display device according to claim 1,
wherein, after the segmentation is performed on the frame body, the display part displays a prescribed image in a region, which is formed between the frame bodies acquired through the segmentation, of the display region of the display part.

4. The display device according to claims 1,
wherein, after the segmentation is performed on the frame body, the display part displays the notification image in accordance with the form of at least one of the plurality of components.

5. The display device according to claim 1, wherein
the frame body is configured to include a first component and a second component, and segmentation is performed on the frame body in such a way that both the first component and the second component or either of them is moved by the movement unit, and
the segmentation is performed on the frame body in the horizontal direction based on a fact that movement direction of the first component and the second component is the horizontal direction when viewed from an observer of the display device.

6. The display device according to claim 1, wherein
before the segmentation is performed on the frame body, the plurality of components of the frame body approach each other without coming into contact with each other, and thus a gap part is formed between adjacent components of the plurality of components, and
a rib part is formed on at least one component of the plurality of components, which conceals the gap part.

* * * * *